UNITED STATES PATENT OFFICE.

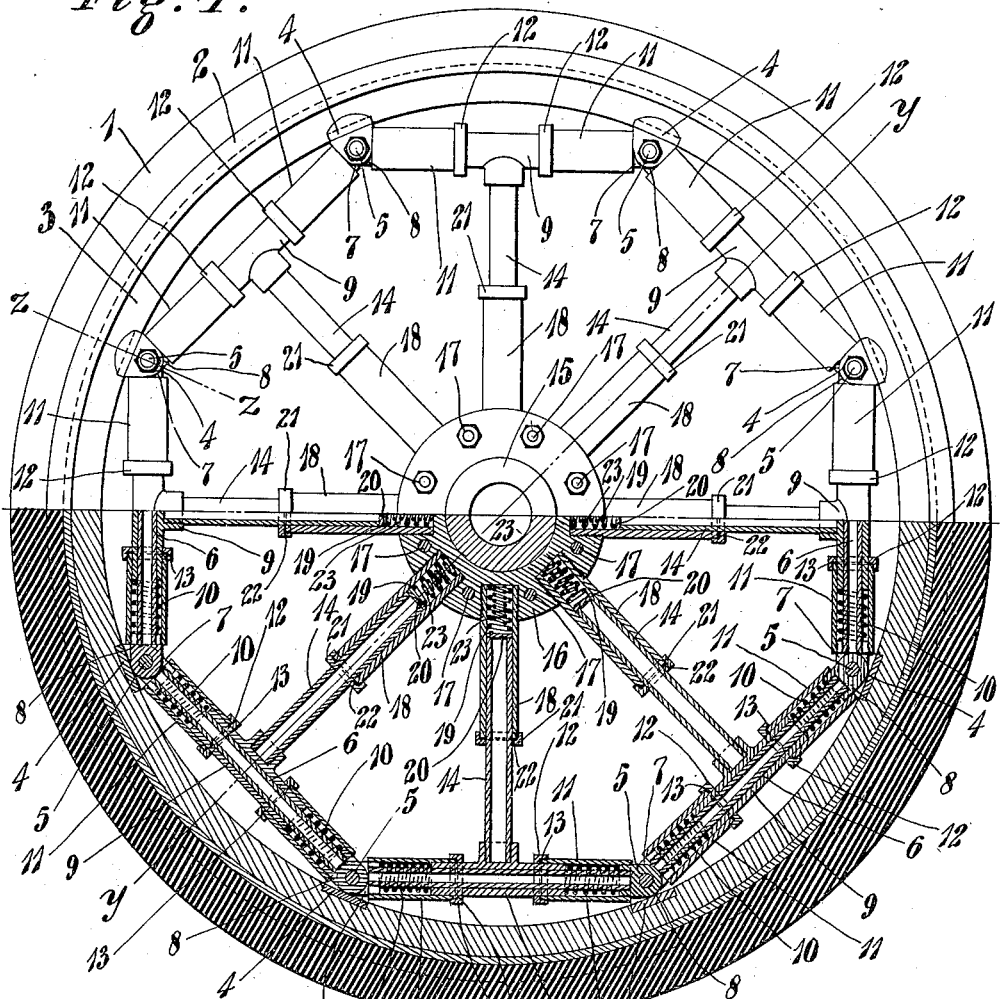

NOAH THOMAS SHARP, OF LUDLOW, KENTUCKY, ASSIGNOR OF ONE-HALF TO ANDREW HOUCK, OF CINCINNATI, OHIO.

RESILIENT VEHICLE-WHEEL.

1,092,755.  Specification of Letters Patent.  Patented Apr. 7, 1914.

Application filed August 27, 1913. Serial No. 786,846.

*To all whom it may concern:*

Be it known that I, NOAH THOMAS SHARP, a citizen of the United States, and a resident of Ludlow, in the county of Kenton and State of Kentucky, have invented certain new and useful Improvements in Resilient Vehicle-Wheels, of which the following is a specification.

My invention relates to vehicle wheels and its object is to take up jar and vibration due to unevenness in the path of travel of the vehicle by means of structure between the rim and hub of the wheel.

The especial object is to provide a device of this character in which strength and lightness are combined, and which will be simple, yet effective in operation, and which will not be torsionally yieldable.

My invention consists in the parts and in the details of construction and arrangement of parts as will hereinafter be more fully described and claimed.

In the drawing: Figure 1 is a sectional side elevation of a wheel embodying my invention, the upper half being shown in elevation, and the lower half in section on a line corresponding to the line $x$—$x$ of Fig. 2; Fig. 2 is a cross section taken radially of the wheel on a line corresponding to the line $y$—$y$ of Fig. 1, only half of the section of the wheel being shown; and Fig. 3 is a partial radial section on a line corresponding to the line $z$—$z$ of Fig. 1.

As shown herein, the wheel comprises a tire 1 and rim 2, holding the tire, and a felly 3 inside the rim. However, it will be understood that, so far as my invention is concerned, the rim 2 and felly 3, and even the tire 1, substantially make up the rim of the wheel and shall be referred to in subsequent description, and in the claim collectively as the rim or outer circular part of the wheel, unless otherwise specified.

As shown specifically, the tire 1 is solid and airless, and the rim 2 is of the type to which the tire 1, which may be of rubber, is vulcanized, while the felly 3, as illustrated, may be of wood. To this felly 3 are rigidly secured a series of brackets 4 which are thus substantially rigidly attached to the rim of the wheel. Each bracket 4 has a transverse pin 5, and, between each two adjacent brackets 4 a chord 6 is fixed by means of said pins 5. Each such chord 6 is preferably tubular and has knuckles 7 and 8 to lie in the brackets 4 and receive the transverse pins 5. The knuckle 7, at one end of each chord 6, is bifurcated, and the knuckle 8, at the other end of each chord 6, is narrow and adapted to fit between the bifurcations of the knuckle 7 of the next adjacent chord 6 within the bracket 4. This arrangement is best seen in Fig. 3 of the drawing. Thus, each two adjacent chords 6 are fixed to each other and substantially to the rim of the wheel by means of the single pin 5. Each of these chords 6 has a smooth region between its knuckles 7 and 8, and upon this region a T-shaped head 9 slides longitudinally. Between this head 9 and the knuckles 7 and 8, at the respective ends of the chord 6, are helical springs 10 surrounding the chord 6 and compressed between the head 9 and the knuckle 7 or 8, as the case may be.

To keep out foreign matter likely to clog the mechanism, sleeves 11 are fixed on the knuckles 7 and 8 around the springs 10, and extend some distance along the outside of the head 9 from the respective adjacent ends of said head, in such a manner that said head can slide inside these sleeves. To further guard against entrance of foreign matter, each sleeve 11 may be provided with a stuffing cap 12, confining a suitable gasket 13 against the free end of the sleeve, around the outside of the head 9.

Fixed in the stem part of each T-shaped head 9 is a stem 14, which preferably is tubular as illustrated and threaded into said part of the head 9, so that it is rigid therein and extends at right angles to the chord 6, radially inwardly of the wheel.

The hub 15 of the wheel may be of any approved construction, and in any event receives a ring 16 where the hub of an ordinary wheel usually receives the butt ends of the spokes. Said ring 16 may be secured in said hub 15 by means of transverse bolts 17 passing through the flanges of the hub and through said ring 16. Fixed in this ring 16, to receive the respective stems 14, are sockets 18 that extend radially outward far enough to form ample guides for the stems 14 to slide radially inwardly and outwardly of the wheel. Such sockets 18 may be threaded into the ring 16 as shown, so that they are rigid with respect to said ring. Between the inner end of the stem 14, inside each socket, and the bottom of such socket, which may be the bottom of the recess in which the socket is threaded, a helical spring 19 is compressed. With the stem 14 tubular, it is desirable to have a suitable disk or washer 20 interposed between the open end of said stem 14 and said spring 19 to form an ample bearing for this end of the spring.

To prevent the entrance of foreign matter inside the socket 18, which might clog and interfere with the working of the mechanism inside the socket, the free outer end of the socket 18 is provided with a stuffing cap 21, confining a suitable gasket 22 against the end of the socket around the stem 14.

To reinforce the springs 19 under extremely heavy impulses, smaller auxiliary helical springs 23 may be provided, inside the springs 19 in the sockets 18.

From the foregoing description, and upon inspection of the drawing, it will be seen that the hub and rim of the wheel are movable radially with respect to each other in an infinite number of different directions, due to the combined yielding of the springs 10 on the chords 6 and the springs 19 in the hub sockets 18. However, on account of the T-shaped heads 9 being rectilinearly guided on the chords 6, and with the stems 14 similarly guided radially, it is impossible for the rim and hub to move relatively circumferentially or torsionally of the wheel. Thus, no stress incident to the driving of the vehicle by force exerted outwardly from the hub to the rim, as in a motor vehicle, or by force exerted inwardly from the rim to the hub, as in a vehicle tractionally propelled, will be transmitted to the springs 10 or 19. On account of this, such springs will have only the duty of taking up the shocks due to displacement of the rim and hub radially with respect to each other. This is especially important in the provision of resilient wheels for motor vehicles, where repeated and varying impulses must be transmitted from the hub to the rim during starting of the motor, during compulsion of the vehicle, and during the application of brakes. Where the springs of the resilient wheel are subject to these repeated stresses, crystallization of the spring material quickly takes place and the spring soon breaks.

My invention also involves only the use of compression helical springs, which are by far the most reliable. The breakage of one of the springs in my device will not be dangerous to the occupants of the vehicle, because the wheel will remain intact, and the only effect noticeable to an occupant of the vehicle will be the increased roughness of riding, due to the lack of support at the point in the internal structure of the wheel where the spring is broken. This minimization of danger and inconvenience on breakage of any of the springs is largely due to the ample bearings afforded between the various sliding parts of the internal structure, making it practically impossible for one sliding part to be disengaged from the other, even with the breakage of a number of springs simultaneously.

As shown in the drawing, the wheel comprises eight of the chords 6, and other parts accordingly. I contemplate even an increase of the number of chords and of parts accordingly, when the size of the wheel permits the requisite amount of relative movement between the different sliding parts in such number. An important concomitant of such ample number of chords and other parts accordingly, is the practicability of joining the ends of adjacent chords rigidly to each other and to the felly or rim of the wheel, as hereinbefore described, so that said chords make up a complete connected system of reinforcements for the wheel rim or felly. By this means, each chord and the arc of the wheel rim which the chord traverses constitute a truss with the chord in tension to resist flattening of the wheel rim from outward pressure, and also acting as a beam through its stem 14 pressing radially inward against the helical spring 19 in the hub, this radial pressure being transmitted to the rim through the brackets 4 at the respective ends of each chord. By such construction it is possible to make the felly and rim comparatively light and in some cases permitting the felly to be dispensed with entirely, joining the chords directly to the rim and allowing this continuous system of chords to act instead of the felly as a support for the rim. Not only are these outer parts of the wheel thus allowed to be lighter, but the interior parts may also be comparatively light on account of the increased number of parts as described. It will be seen that the practicability of thus having a comparatively large number of chords, and other parts accordingly, is largely due to the novel combination and arrangement of these parts as described.

Having fully described my invention, what I claim as new and desire to secure by Letters Patent is:

In a resilient vehicle wheel, the combination with the outer circular part of the wheel and a hub for the wheel, of sockets extending from said hub, chords fixed to said outer circular part of the wheel inside thereof, a member at right angles to each chord movable therealong and guided thereon to maintain its angle to the chord, a stem on each member extending into a respective socket on the hub, springs resisting movement of the members along the chords in both directions, each of said chords having heads at its ends against which the springs bear to resist the movement of said members along the chords, sleeves covering said springs fixed on said heads and extending over respective ends of the members, and stuffing caps on said sleeves around said members preventing the entrance of foreign substances to said springs and to the surfaces of the chords where said members slide thereon.

NOAH THOMAS SHARP.

Witnesses:
ANDREW HOUCK,
CLARENCE PERDEW.

Copies of this patent may be obtained for five cents each, by addressing the "Commissioner of Patents, Washington, D. C."